United States Patent
Li et al.

(10) Patent No.: US 11,546,972 B2
(45) Date of Patent: Jan. 3, 2023

(54) ELECTRIC HEATING MODULE STRUCTURE, INSTALLATION METHOD AND FORMING METHOD THEREOF, AND WIND TURBINE

(71) Applicant: BEIJING GOLDWIND SCIENCE & CREATION WINDPOWER EQUIPMENT CO., LTD., Beijing (CN)

(72) Inventors: Jie Li, Beijing (CN); Yanpeng Xie, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 619 days.

(21) Appl. No.: 16/194,671

(22) Filed: Nov. 19, 2018

(65) Prior Publication Data
US 2019/0268974 A1    Aug. 29, 2019

(30) Foreign Application Priority Data
Feb. 27, 2018   (CN) .......................... 201810161713.4

(51) Int. Cl.
*H05B 3/28*    (2006.01)
*H05B 3/34*    (2006.01)
(Continued)

(52) U.S. Cl.
CPC ............. *H05B 3/14* (2013.01); *F03D 1/0675* (2013.01); *F03D 80/40* (2016.05); *G05D 23/19* (2013.01); *H05B 3/34* (2013.01); *F05B 2230/80* (2013.01)

(58) Field of Classification Search
CPC .... H05B 3/28–283; H05B 3/34; B64D 15/12; F03D 80/00; F03D 80/40; F03D 80/60;
(Continued)

(56) References Cited

U.S. PATENT DOCUMENTS 2,757,273 A  *  7/1956  Taylor .................... B64D 15/12
                                                    219/537
5,375,324 A  *  12/1994  Wallace .................. F03D 3/065
                                                    29/889.71
(Continued)

FOREIGN PATENT DOCUMENTS

| CN | 103826336 A | 5/2014 |
| CN | 106949022 A | 7/2017 |

(Continued)

OTHER PUBLICATIONS

First Canada Office Action Application No. 3024033; dated June 4, 2020.
(Continued)

*Primary Examiner* — Michael A Laflame, Jr.

(57) ABSTRACT

An electric heating module structure, an installation method, a forming method, and a wind turbine are provided. The electric heating module structure is configured for melting ice on a blade, and includes an electric heating module, a positive conductive wire and a negative conductive wire. The positive conductive wire and the negative conductive wire are integrally formed with the electric heating module, to supply power to the electric heating module. The integrally formed electric heating module, the positive conductive wire and the negative conductive wire are laid in an outer layer of the blade.

13 Claims, 2 Drawing Sheets

(51) Int. Cl.
*F03D 80/00* (2016.01)
*H05B 3/14* (2006.01)
*G05D 23/19* (2006.01)
*F03D 80/40* (2016.01)
*F03D 1/06* (2006.01)

(58) Field of Classification Search
CPC .............. F05B 2230/60; F05B 2240/21; F05B 2280/2006; F05B 2280/5002; F05B 2280/6001; F05B 2280/6002; F05B 2280/6003
See application file for complete search history.

(56) References Cited

U.S. PATENT DOCUMENTS

| | | | | |
|---|---|---|---|---|
| 6,031,214 | A * | 2/2000 | Bost | B64D 15/12 219/202 |
| 6,283,411 | B1 * | 9/2001 | Giamati | B64D 15/12 244/134 A |
| 9,469,408 | B1 * | 10/2016 | Elangovan | B64D 15/12 |
| 2003/0205642 | A1 * | 11/2003 | Petrenko | E01C 11/265 244/134 D |
| 2006/0083907 | A1 * | 4/2006 | Bech | B32B 7/12 428/212 |
| 2013/0170992 | A1 * | 7/2013 | Loewe | F03D 1/0675 416/95 |
| 2014/0241896 | A1 * | 8/2014 | Zhang | D01F 9/14 416/230 |
| 2014/0348654 | A1 * | 11/2014 | Klein | F03D 80/40 416/95 |
| 2016/0338151 | A1 | 11/2016 | Lindskog | |
| 2018/0057176 | A1 * | 3/2018 | Kinlen | B64D 15/12 |
| 2018/0245566 | A1 * | 8/2018 | Sawada | F03D 1/0675 |
| 2019/0208580 | A1 * | 7/2019 | Conner | H05B 3/342 |

FOREIGN PATENT DOCUMENTS

| | | |
|---|---|---|
| CN | 107642465 A | 1/2018 |
| EP | 2 754 891 A1 | 7/2014 |
| JP | 2001237052 A | 8/2001 |

OTHER PUBLICATIONS

Partial European Search Report dated Jul. 12, 2019; Appln. No. 18210143.6.

* cited by examiner

ELECTRIC HEATING MODULE STRUCTURE, INSTALLATION METHOD AND FORMING METHOD THEREOF, AND WIND TURBINE

CROSS REFERENCE OF RELATED APPLICATION

This application claims the priority to Chinese Patent Application No. 201810161713.4, titled "ELECTRIC HEATING CHIP STRUCTURE, INSTALLATION METHOD, FORMING METHOD, AND WIND TURBINE", filed on Feb. 27, 2018 with the State Intellectual Property Office of People's Republic of China, which is incorporated herein by reference in its entirety.

TECHNICAL FIELD

The present disclosure relates to the technical field of wind power generation, and in particular, to an electric heating module structure, an installation method and a forming method thereof, and a wind turbine.

BACKGROUND

With a shortage of energy sources and people's growing concept of environment protection, wind power generation gradually becomes the most widely used renewable energy source. A blade of a wind turbine will be frozen due to the change of weather (such as freezing rain), and an ice layer on the blade seriously influences a normal operation of the wind turbine.

At present, an influence of the ice layer on the blade is reduced by the following method. In a case the blade is frozen to a certain extent, a deicing operation is performed under stopping the wind turbine or it may wait until the temperature rises to naturally de-ice. In a case that icing is not severe, the wind turbine generator is adjusted to reduce a capacity thereof which reduces power generation efficiency of the wind turbine.

A Chinese Patent (Application No. 201410025123.0) discloses an electric heating ice melting rotor blade of a wind turbine, an electric heating module, a forming apparatus, and a forming method thereof. The electric heating module is laid on the blade, the electric heating module is woven by a carbon fiber material, side lines of two wires thereof are led out from an upper side and a lower side, and in a case that the blade is frozen, the electric heating module can be powered on and heated to melt the ice on the blade.

However, for the electric heating module on the electric heating ice melting rotor blade and the conductive device, terminals led out from two sides of the electric heating module are connected by a cylindrical cable. Such connection requires connecting each bundle of carbon fibers and a wire via a plastic tube, and then connecting the metal wire with a bus bar. The connection is complicated, and requires a large connection space. It requires a larger space for refitting when laying on the blade. It has a great processing depth for the blade and a great processing difficulty when refitting is performed on the blade of an operating wind turbine, and requires a large amount of work when recovering a surface of the blade.

SUMMARY

An electric heating module structure for melting ice on a blade is provided according to the present disclosure. The electric heating module structure can facilitate electrical connection of an electric heating module, and improve installation efficiency.

An electric heating module structure for melting ice on a blade is provided according to an aspect of the present disclosure, including: an electric heating module, a positive conductive wire and a negative conductive wire, where the positive conductive wire and the negative conductive wire are integrally formed with the electric heating module, to supply power to the electric heating module, and where the integrally formed electric heating module, the positive conductive wire and the negative conductive wire are laid in an outer layer of the blade. Both the positive conductive wire and the negative conductive wire are installed in the outer layer of the blade, which can facilitate electrical connection of the electric heating module, and improve installation efficiency.

According to an embodiment of the present disclosure, the lengthwise direction of the positive conductive wires and the lengthwise direction of the negative conductive wires may be consistent with the lengthwise direction of the blade. Compared with laying the wires along the widthwise direction, the wires are laid along the lengthwise direction to reduce the number of the positive conductive wires and the negative conductive wires. Connecting wires which electrically connect the positive conductive wires and the negative conductive wires are not required. Because a power supply is generally arranged at a blade root, power supply wires connected to the positive conductive wires and the negative conductive wires can be connected to terminals of the positive conductive wires and the negative conductive wires, which are close to the blade root, to effectively reduce a length of the power supply wires and simplify connection.

According to an embodiment of the present disclosure, the positive conductive wire and the negative conductive wire can be laid in parallel along a direction from a blade root to a blade tip. The positive conductive wire and the negative conductive wire are laid in parallel to facilitate installation.

According to an embodiment of the present disclosure, the electric heating module may include a glass fiber cloth and carbon fiber bundles, where the carbon fiber bundles are woven on the glass fiber cloth. The glass fiber cloth serves as a weaving base to improve structural strength.

According to an embodiment of the present disclosure, the carbon fiber bundles are multiple carbon fiber bundles, where the multiple carbon fiber bundles are interlaced with each other in a lengthwise direction and a widthwise direction of the blade, and the multiple carbon fiber bundles are electrically connected between the positive conductive wire and the negative conductive wire. The multiple carbon fiber bundles are interlaced to reduce an influence of an open circuit caused by broken carbon fiber bundles.

According to an embodiment of the present disclosure, the outer layer of the blade may include an outer skin and an inner skin, where the integrally formed electric heating module, the positive conductive wire, and the negative conductive wire are laid between the outer skin and the inner skin. The electric heating module are laid between the two skins to prevent the electric heating module from being damaged due to being laid unduly outward, while providing a preset amount of heat for melting ice.

According to an embodiment of the present disclosure, the positive conductive wire and the negative conductive wire are arranged in the outer skin, which can reduce a punching depth and facilitate connecting the positive conductive wire and the negative conductive wire electrically to an external power supply.

According to an embodiment of the present disclosure, the positive conductive wire and the negative conductive wire are woven to be connected to the electric heating module, which can install the electric heating module at a preset position once and for all, and improve installation convenience.

According to an embodiment of the present disclosure, an end of each of the positive conductive wire and the negative conductive wire, which is close to a blade root, is electrically connected to the external power supply via a through-hole running through the outer layer of the blade. The exposed ends of the positive conductive wire and the negative conductive wire are close to the blade root, which can reduce the number of holes to be punched for electrical connection.

According to an embodiment of the present disclosure, the positive conductive wire and the negative conductive wire are electrodes made by a flat cable.

A method for installing an electric heating module structure for melting ice on a blade is provided according to another aspect of the present disclosure, including: processing a portion of the blade to remove a part of an outer skin and an inner skin of the blade; laying another inner skin on the portion of the blade where the outer skin and the inner skin are removed; laying an electric heating module structure on the laid inner skin; and laying another outer skin on the electric heating module structure, so that a positive conductive wire and a negative conductive wire are located in the laid outer skin.

A method for forming an electric heating module structure for melting ice on a blade is provided according to another aspect of the present disclosure, where the method may include: forming an electric heating module, a positive conductive wire and a negative conductive wire integrally in an outer layer of the blade, in a molding process of the blade.

A wind turbine is provided according to another aspect of the present disclosure, where the wind turbine may include the aforementioned electric heating module structure for melting ice on the blade.

According to an embodiment of the present disclosure, the electric heating module structure may be laid at a leading edge or a trailing edge of the blade.

The electric heating module structure according to embodiments of the present disclosure can improve installation efficiency of an ice melting system, and has simple electrical connection.

The electric heating module structure according to embodiments of the present disclosure simplifies a manufacture process, simplifies a refitting process on the blade, reduces an amount of processing work on the blade, reduces a refitting difficulty, and reduces a working time.

BRIEF DESCRIPTION OF THE DRAWINGS

Hereinafter exemplary embodiments of the present disclosure are described in detail in conjunction with drawings, and those skilled in the art can appreciate the present disclosure thoroughly.

DETAILED DESCRIPTION OF THE EMBODIMENTS

Figure 1:
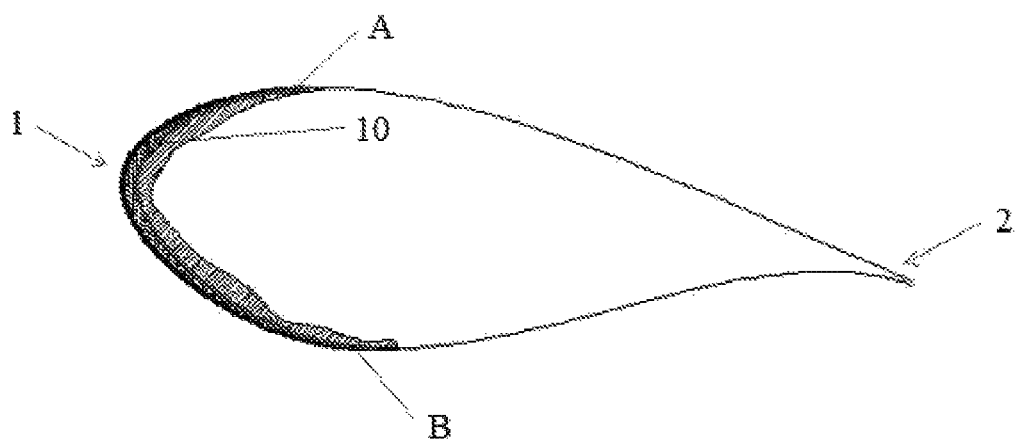
FIG. 1 is a schematic diagram of a laying position of an electric heating module structure according to an exemplary embodiment of the present disclosure.

Hereinafter embodiments of the present disclosure are illustrated with reference to drawings, where same reference signs in the drawings represent a same member.

According to an exemplary embodiment, an electric heating module structure for melting ice on a blade may include an electric heating module and conductive wires. The electric heating module and the conductive wires are integrally formed and laid in an outer layer of the blade, so as to heat the outer layer of the blade and remove an ice layer on an outer surface of the blade. Both the electric heating module and the conductive wires are installed or laid in the outer layer of the blade, which facilitates electrical connection of the electric heating module and can improve the melting efficiency. Hereinafter the electric heating module structure according to the present disclosure is described in detail in conjunction with FIGS. 1-3.

Figure 2:
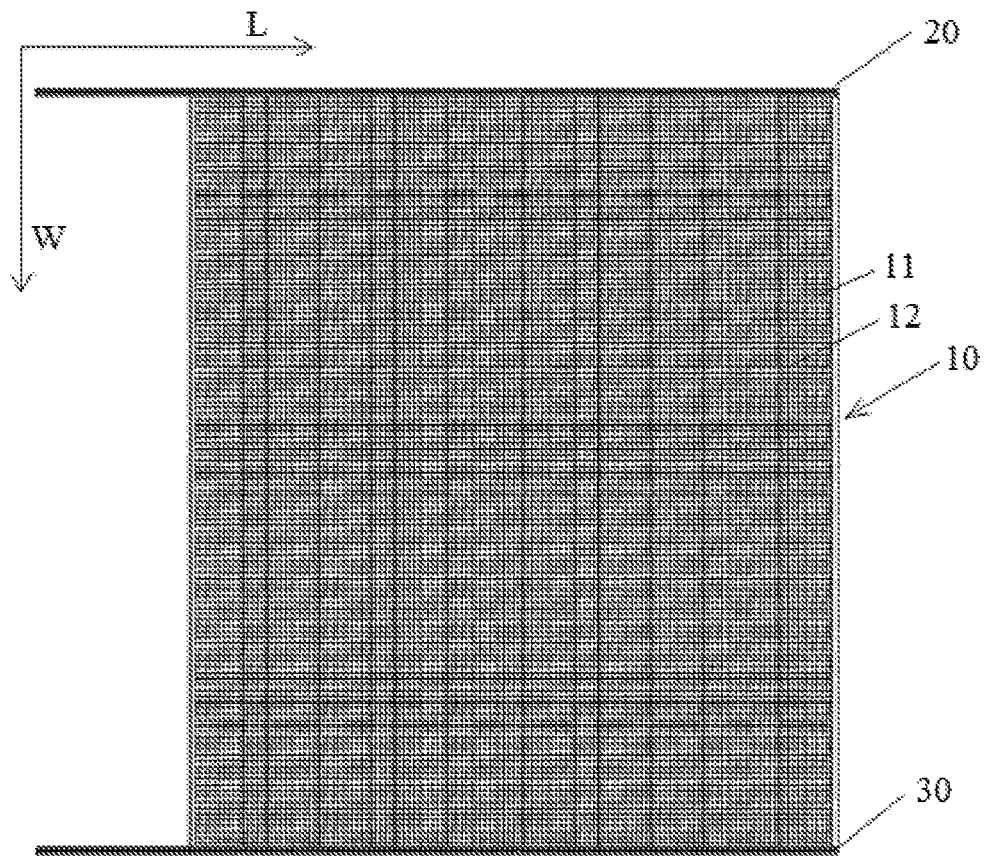
FIG. 2 is a schematic front view of a laying manner of an electric heating module structure according to an exemplary embodiment of the present disclosure.
Figure 3:
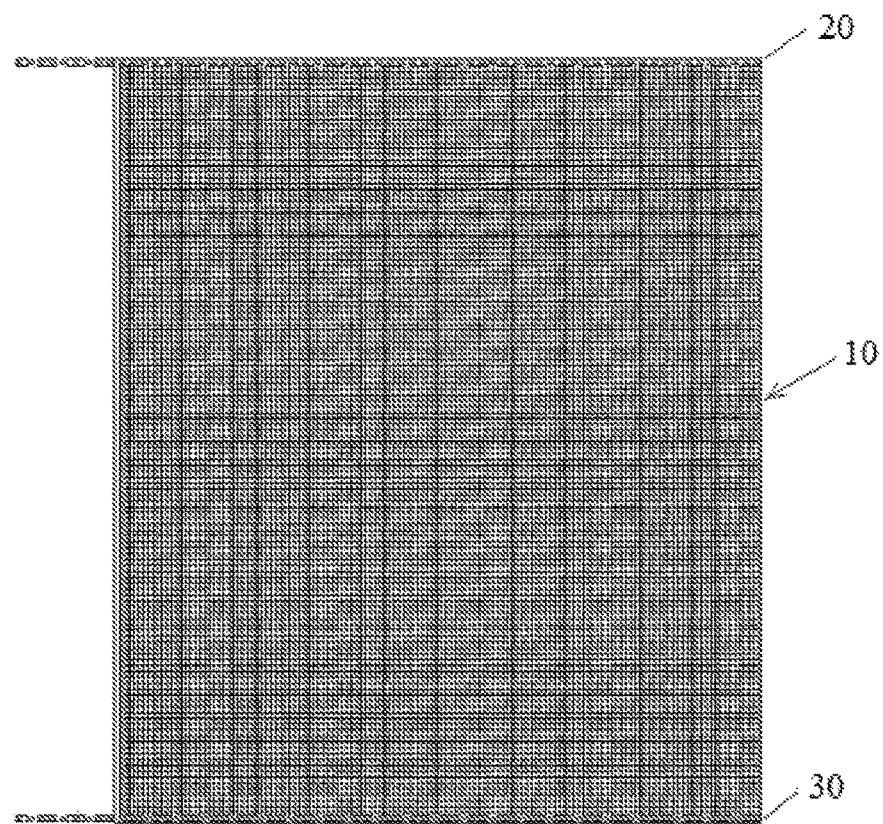
FIG. 3 is a schematic back view of a laying manner of an electric heating module structure according to an exemplary embodiment of the present disclosure.

FIG. 1 is a schematic diagram of a laying position of an electric heating module structure according to an exemplary embodiment of the present disclosure, FIG. 2 is a schematic front view of a laying manner of an electric heating module structure according to an exemplary embodiment of the present disclosure, and FIG. 3 is a schematic back view of a laying manner of an electric heating module structure according to an exemplary embodiment of the present disclosure.

According to an exemplary embodiment of the present disclosure, an electric heating module structure for melting ice on a blade may include an electric heating module 10, a positive conductive wire 20, and a negative conductive wire 30.

The electric heating module 10 can be powered on to heat an outer surface of the blade and melt an ice layer on the outer surface of the blade. The electric heating module 10 may be laid in the outer layer of the blade. The positive conductive wire 20 and the negative conductive wire 30 may be laid in the outer layer of the blade along a lengthwise direction of the blade to supply power to the electric heating module 10.

The electric heating module 10, the positive conductive wire 20, and the negative conductive wire 30 may be integrally formed. For example, the positive conductive wire 20 and the negative conductive wire 30 may be integrally connected to the electric heating module 10, so as to supply power to the electric heating module 10. In an installation process, the electric heating module 10, the positive conductive wire 20, and the negative conductive wire 30 may be simultaneously installed in the outer layer of the blade. Before installation, the electric heating module 10, the positive conductive wire 20, and the negative conductive wire 30 are integrally connected and simultaneously arranged, which can simplify laying. The laying positions can be flexible, and the electric heating module structure can fit tightly on the blade. Herein, the integral formation of the electric heating module 10, the positive conductive wire 20, and the negative conductive wire 30 may refer to that the electric heating module 10, the positive conductive wire 20, and the negative conductive wire 30 are woven simultaneously as integrity.

Reference is made to FIG. 1 which shows a cross section along a widthwise direction of a blade. The electric heating module structure may be arranged at a position where it is easy to freeze. For example, the electric heating module structure may be arranged at a leading edge 1 (generally, the position between A and B in FIG. 1) of the blade, or at a trailing edge 2 of the blade. Electric heating module structures may be arranged at different positions of the outer layer of the blade, so as to heat the different positions of the outer layer of the blade.

As shown in FIG. 2, the positive conductive wire 20 and the negative conductive wire 30 may be laid in parallel in the outer layer of the blade, along a direction from a blade root to a blade tip. Herein the outer layer of the blade may be a resin layer or a resin fiber layer. Namely, the outer layer of the blade may include only a resin, or include a resin and a glass fiber cloth.

The positive conductive wire 20 and the negative conductive wire 30 may serve as an installation electrode, and may be a flat cable serving as a bus bar. The positive conductive wire 20 and the negative conductive wire 30 may be formed by at least one of aluminum (Al), silver (Ag), tin (Sn), copper (Cu), zinc (Zn), and the like.

The positive conductive wire 20 and the negative conductive wire 30 may be laid in the outer layer of the blade, along a lengthwise direction L of the blade. Namely, the lengthwise directions of the positive conductive wire 20 and the negative conductive wire 30 may be consistent with a lengthwise direction of the blade. With such arrangement of the positive conductive wire 20 and the negative conductive wire 30, when connecting power supply wires to the conductive wires, it may choose the ends of the conductive wires, which are close to the blade root, for the connection. Hence, the length of the power supply wires is effectively reduced, a wiring structure of the power supply wires is greatly simplified, and a problem is prevented that the power supply wires run under the electric heating module to increase a thickness of the blade at the corresponding position. The positive conductive wire 20 and the negative conductive wire 30 may be laid substantially in parallel when being laid from the blade root toward the blade tip. Such a laying manner facilitates electrical connection of the electric heating, module 10.

Optionally, the electric heating module 10 may include a glass fiber cloth 11 and carbon fiber bundles 12. The glass fiber cloth 11 may serve as a base, and the carbon fiber bundles 12 may be laid on the glass fiber cloth. For example, the carbon fiber bundles 12 may be woven on the glass fiber cloth 11.

As shown in FIG. 2 and FIG. 3, the carbon fiber bundles 12 may be multiple carbon fiber bundles, and the multiple carbon fiber bundles may be interlaced with each other. Optionally, the multiple carbon fiber bundles are interlaced with each other along the lengthwise direction L (or a spanwise direction) of the blade and the widthwise direction W (or a chordwise direction) of the blade. The multiple carbon fiber bundles are electrically connected between the positive conductive wire 20 and the negative conductive wire 30. For example, the ends of the multiple carbon fiber bundles, arranged along the widthwise direction, are electrically connected to the positive conductive wire 20 and the negative conductive wire 30 respectively.

Compared with laying the conductive wires along the widthwise direction W of the blade, the positive conductive wire 20 and the negative conductive wire 30 are laid along the lengthwise direction L of the blade to reduce damages to the outer layer of the blade and increase installation efficiency.

For example, in a case that the positive conductive wire and the negative conductive wire are laid along the widthwise direction, it is necessary to lay multiple rows of positive conductive wires and negative conductive wires, and it is necessary to electrically connect each row of positive conductive wires, and electrically connect the negative conductive wires. Such a connection manner needs to occupy a large laying space and causes a severe damage to the outer layer of the blade, and it is difficult to recover the outer layer or shape of the blade.

In addition, the carbon fiber bundles 12 are woven with each other (for example, woven with each other along the lengthwise direction L of the blade and the widthwise direction W of the blade), instead of connecting both ends of each single carbon fiber bundle separately to the positive conductive wire 20 and the negative conductive wire 30. Such weaving manner can prevent the carbon fiber from being broken and causing an open circuit, which can improve a utilization rate of the carbon fiber bundles and increase heating efficiency. Further, such weaving manner does not need to lay a connecting wire along the widthwise direction to connect electrically the carbon fiber bundles laid horizontally to the positive conductive wire and the negative conductive wire, therefore simplifying an installation process.

It should be noted that the outer layer of the blade may include two layers of skins, such as an outer skin and an inner skin. The electric heating module structure may be installed in the outer skin only, in a case that the electric heating module structure is thin and the outer skin is thick. Optionally, the positive conductive wire 20 and the negative conductive wire 30 may also be laid in the outer skin.

The electric heating module 10 of the present disclosure may be installed between the outer skin and the inner skin of the outer layer of the blade, so as to ensure a heating effect while preventing the electric heating module 10 from being too close to the outer surface of the blade to be damaged. Hereinafter, a specific installation process of the electric heating module 10 is illustrated in detail.

Though not indicated in the drawings, the positive conductive wire 20 and the negative conductive wire 30 may be electrically connected to an external power supply. For example, an end of each of the positive conductive wire 20 and the negative conductive wire 30 (such as left ends of the positive conductive wire 20 and the negative conductive wire 30, as shown in FIG. 2 and FIG. 3) may be electrically connected to the external power supply. Optionally, the external power supply is generally arranged at the blade root, and the ends of the positive conductive wire 20 and the negative conductive wire 30, which are close to the blade root, are chosen to be connected to the external power supply (for example, in a case that the external power supply is arranged at a left side as shown in FIG. 2 and FIG. 3, the power supply wires connected to the external power supply may all be connected to the left ends of the positive conductive wire 20 and the negative conductive wire 30 as shown in FIG. 2 and FIG. 3).

For example, an end (the left end) of each of the positive conductive wire 20 and the negative conductive wire 30 may be connected to the external power supply via a through-hole running through the outer layer of the blade. Optionally, the left ends of the positive conductive wire 20 and the negative conductive wire 30 are disposed close to the blade root. In addition, the positive conductive wire 20 and the negative conductive wire 30 may be woven on the electric heating module 10. For example, the positive conductive wire 20 and the negative conductive wire 30 may be woven at an upper side and a lower side of the electric heating module, and such design can increase a contact area between the positive and negative conductive wires 20 and 30 and the electric heating module 10, facilitating electrical connection thereof.

Hereinafter the installation process of the electric heating module structure according to the present disclosure is illustrated in detail.

First, the outer layer of the blade may be processed. For example, the outer layer of the blade may be abraded to remove a part of the skins of the outer layer of the blade. Namely a part of the outer skin and the inner skin of the blade is removed.

Different electric heating module structures may have different thicknesses. During abrasion, both operation complexity and installation reliability are considered, and two layers of skins (such as the outer skin and the inner skin) of the outer layer of the blade are abraded and removed. As described above, each of the outer skin and the inner skin may be a resin fiber layer.

Then, the electric heating module, the positive conductive wire, and the negative conductive wire, which are woven in advance, are installed at a position where the outer layer of the blade is abraded. In a case that the abraded part of the outer layer of the blade has a two-layered skin structure, an inner skin may be partly laid at the abraded position before installing the electric heating module, the positive conductive wire, and the negative conductive wire. Specifically, a glass fiber cloth may be laid at the abraded position, and then the resin is coated. After the inner skin is recovered, the electric heating module, the positive conductive wire, and the negative conductive wire are installed.

Finally, an outer skin is laid on the electric heating module. Similar to laying the inner skin, a glass fiber cloth may be laid, and then resin is coated. In the process of laying the outer skin, the positive conductive wire and the negative conductive wire may be arranged in the outer skin, and the positive conductive wire and the negative conductive wire may be laid along the lengthwise direction of the blade. Optionally, the positive conductive wire and the negative conductive wire are arranged in parallel along the direction from the blade root to the blade tip.

As described above, the positive conductive wire and the negative conductive wire are laid in the outer skin to facilitate electrical connection between both the positive and negative conductive wired and an exterior. In addition, the ends of the positive conductive wire and the negative conductive wire may be exposed during laying the outer skin, which facilitates electrical connection to the external power supply.

Besides installing the electric heating module structure on the molded blade, the electric heating modular structure may be installed during the molding process of the blade. For example, the electric heating module, the positive conductive wire and the negative conductive wire are formed integrally in the outer layer of the blade, in the molding process of the blade.

Specifically, the electric heating module, the positive conductive wire and the negative conductive wire may be laid in a mold of the blade, then a material for molding the blade is laid on the electric heating module, and resin is injected after sealing and pumping to vacuum. In the molding process of the blade, the positions of the positive conductive wire and the negative conductive wire may be labeled, and holes are punched at the labeled positions after the blade is molded. Thereby the ends (arranged close to the blade root) of the positive conductive wire and the negative conductive wire are exposed, so as to facilitate electrical connection to the external power supply.

Figure 4:
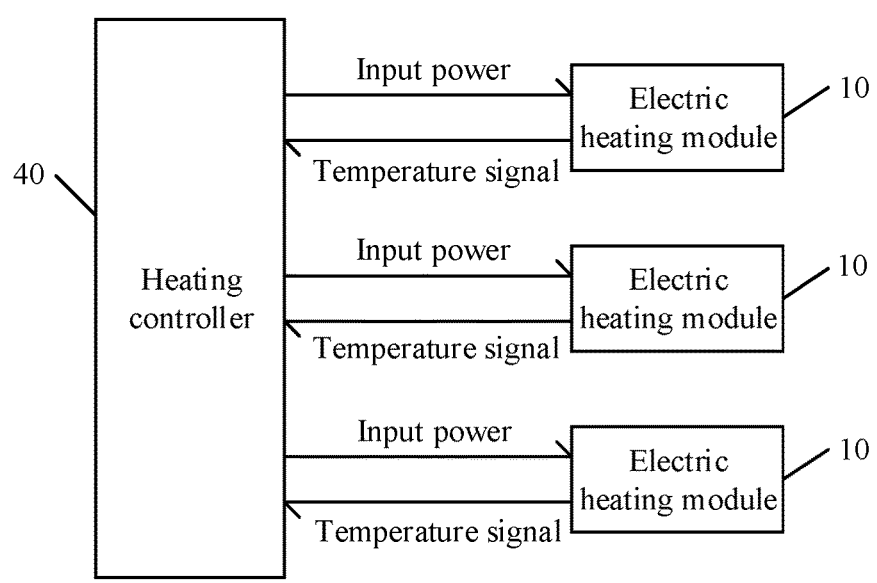
FIG. 4 is a schematic diagram of a method for controlling supplying power to an electric heating module structure according to an exemplary embodiment of the present disclosure.

FIG. 4 is a schematic diagram of a method for controlling supplying power to an electric heating module structure according to an exemplary embodiment of the present disclosure.

The electric heating module structures according to an exemplary embodiment of the present disclosure may be separated from each other. For example, multiple electric heating module structures may be arranged at multiple positions at a leading edge and a trailing edge, respectively. Such arrangement of the multiple electric heating module structures can reduce a size of a single electric heating module.

Because an outer surface of the blade is a curved surface, the arrangement of the multiple electric heating module structures can reduce the size of the single electric heating module and prevent the electric heating modules from being bent and lifted to hamper laying the outer skin. The carbon fiber in the electric heating module can be prevented from being excessively bent and broken, which results in that some carbon fibers cannot be heated by electricity and heating efficiency is reduced.

As shown in FIG. 4, multiple electric heating modules 10 may be controlled by a heating controller 40. Specifically, the heating controller 40 may control the aforementioned external power supply to supply power to the electric heating module 10, and adjust power inputted into each electric heating module 10 based on a temperature sensed by a temperature sensor.

Herein the heating controller 40 may be arranged at a part of the wind turbine other than the blade, for example, arranged in a nacelle of the wind turbine. The heating controller 40 can control output power of the aforementioned external power supply.

Herein the temperature sensor may be separated from the electric heating module by a preset distance. For example, in a case that the multiple electric heating modules are arranged at the leading edge and the trailing edge of the blade, the temperature sensor may be arranged a position between the leading edge and the trailing edge of the blade. Thereby, a temperature of a position other than the heating positions (the positions where the electric heating modules are arranged) of the outer layer of the blade can be sensed. Hence, the heating controller 40 can control, based on the sensed temperature, the power inputted into each electric heating module 10, so that each temperature sensed by the sensor is higher that a preset temperature (such as 20 degree of centigrade). Thereby, the whole outer surface of the blade is heated, and the ice layer at the outer surface of the blade is removed.

Similarly, multiple temperature sensors may be installed. The heating controller 40 may adjust, based on a temperature sensed by each temperature sensor, the power inputted into the corresponding electric heating module 10 at the corresponding position. Namely, the heating controller 40 can control power inputted into each electric heating module, so that the input power for each electric heating module is different, and thereby temperature at the outer surface of the blade is uniform, facilitating highly efficient deicing.

The wind turbine on which the aforementioned electric heating module structure is installed can melt the ice layer at the outer surface of the blade. The wind turbine is prevented from being used at a reduced capacity, and power generation efficiency of the wind turbine is ensured.

According to the above-illustrated exemplary embodiments of the present disclosure, the electric heating module structure can be installed in the outer layer of the blade, by using the laying method, installation method or forming method described above. Thereby, the outer layer of the blade is heated by electricity, so that the ice layer at the outer surface of the blade is melted and deicing efficiency is high.

The electric heating module structure according to the embodiments of the present disclosure can reduce damages to the outer layer of the blade as much as possible while meeting a heating requirement, which is simple to operate.

The electric heating module structure according to the embodiments of the present disclosure can increase installation efficiency of the ice melting system, which has a simple electrical connection.

The electric heating module structure according to the embodiments of the present disclosure simplifies fabricating process, simplifies refitting process on the blade, reduces an amount of processing work on the blade, reduces refitting difficulty, and reduces working time.

In addition, the electric heating module structure according to the embodiments of the present disclosure can be formed in the outer layer of the blade in the molding process of the blade, which has a small influence on the fabricating process of the blade.

In addition, by using the heating controller to control the electric heating modules at different positions respectively, uniformity of heating and deicing efficiency can be improved.

In addition, the electric heating module structure according to the embodiments of the present disclosure can meet requirements of different environments, provide a high reliability, and is convenient to maintain.

Hereinabove specific embodiments of the present disclosure are described in detail. Although some embodiments have been illustrated and described, those skilled in the art should appreciate that those, embodiments can be combined, modified or improved without deviating from claims and equivalents thereof which are limited by the principle and spirit of the present disclosure, and those combinations, modifications or improvements should fall within the protection scope of the present disclosure.

The invention claimed is:

1. An electric heating module structure for melting ice on a blade, comprising:
    an electric heating module, comprising structural fibers;
    a positive conductive wire; and
    a negative conductive wire,
    wherein the positive conductive wire and the negative conductive wire are integrally formed with the electric heating module, to supply power to the electric heating module, and
    wherein the integrally formed electric heating module, the positive conductive wire and the negative conductive wire are laid in an outer layer of the blade, and
    wherein the electrical connection between the positive conductive wire and the electric heating module is implemented by interlacing the positive conductive wire with the structural fibers of the electric heating module, and electrical connection between the negative conductive wire and the electric heating module is implemented by interlacing the structural fibers of the negative conductive wire with the electric heating module.

2. The electric heating module structure for melting ice on the blade according to claim 1, wherein a lengthwise direction of the positive conductive wire and a lengthwise direction of the negative conductive wire are consistent with a lengthwise direction of the blade.

3. The electric heating module structure for melting ice on the blade according to claim 2, wherein the positive conductive wire and the negative conductive wire are laid in parallel along a direction from a blade root to a blade tip.

4. The electric heating module structure for melting ice on the blade according to claim 1, wherein the structural fibers comprises a glass fiber cloth and carbon fiber bundles, and the carbon fiber bundles are woven on the glass fiber cloth.

5. The electric heating module structure for melting ice on the blade according to claim 4, wherein the carbon fiber bundles comprise a plurality of carbon fiber bundles, the plurality of carbon fiber bundles are interlaced with each other in a lengthwise direction and a widthwise direction of the blade, and the plurality of carbon fiber bundles are electrically connected between the positive conductive wire and the negative conductive wire.

6. The electric heating module structure for melting ice on the blade according to claim 1, wherein the outer layer of the blade comprises an outer skin and an inner skin, and the integrally formed electric heating module, the positive conductive wire, and the negative conductive wire are laid between the outer skin and the inner skin.

7. The electric heating module structure for melting ice on the blade according to claim 6, wherein the positive conductive wire and the negative conductive wire are arranged in the outer skin.

8. The electric heating module structure for melting ice on the blade according to claim 1, wherein an end of each of the positive conductive wire and the negative conductive wire, which is close to a blade root, is electrically connected to an external power supply via a through-hole running through the outer layer of the blade.

9. The electric heating module structure for melting ice on the blade according to claim 1, wherein the positive conductive wire and the negative conductive wire are electrodes made by a flat cable.

10. A method for installing the electric heating module structure according to claim 1, comprising:
    processing a portion of the blade to remove a part of an outer skin and an inner skin of the blade;
    laying another inner skin on the portion of the blade where the outer skin and the inner skin are removed;
    laying the electric heating module structure on the laid inner skin; and
    laying another outer skin on the electric heating module structure, so that the positive conductive wire and the negative conductive wire are located in the laid outer skin.

11. A method for forming the electric heating module structure according to claim 1, comprising:
    forming the electric heating module, the positive conductive wire and the negative conductive wire integrally in the outer layer of the blade, in a molding process of the blade, wherein both the positive conductive wire and the negative conductive wire are interlaced with the electric heating module to achieve electrical connection to the electric heating module.

12. A wind turbine, comprising the electric heating module structure for melting ice on the blade according to claim 1.

13. The wind turbine according to claim 12, wherein the electric heating module structure is laid at a leading edge or a trailing edge of the blade.

\* \* \* \* \*